Patented Mar. 25, 1952

2,590,247

UNITED STATES PATENT OFFICE 2,590,247

METHOD OF BROMINATING 1-AMINO-2-SULFO-ANTHRAQUINONE

Clarence E. Hieserman, Cumberland, Md., assignor to Celanese Corporation of America, a corporation of Delaware No Drawing. Application August 28, 1948, Serial No. 46,721

3 Claims. (Cl. 260—371)

This invention relates to the halogenation of organic compounds and relates more particularly to an improved process for the utilization of fluid halogens in the halogenation of organic compounds.

An object of this invention is the provision of an efficient and economical process for the production of halogenated organic compounds wherein a fluid halogen is employed as the halogenating agent.

Another object of this invention is to provide a novel process for the utilization of free, fluid halogens as halogenating agents wherein the rate of addition of said halogens may be accurately controlled and the halogen evenly distributed throughout the reaction medium employed.

Yet another object of this invention is to provide an improved process for the production of halogenated anthraquinone compounds suitable for use as intermediates, for example, in the production of dyestuffs.

A further object of this invention is the provision of an efficient and economical process for the production of 1-amino-2-sulfo-4-brom-anthraquinone by the direct bromination of 1-amino-2-sulfo-anthraquinone.

Other objects of this invention will appear from the following detailed description.

In the production of halogenated organic compounds by direct halogenation methods wherein a normally fluid halogen is introduced into the reaction medium containing the organic compound to be halogenated, the handling of the fluid halogen is both difficult and dangerous. For example, fluorine, which at room temperature is in vaporous form, reacts quite rapidly with many organic compounds and the heat liberated is usually so great that the reaction may even take place with explosive violence; chlorine and bromine also react directly and quite vigorously with many organic compounds. In order to enable reactions employing the halogens to be better controlled, the use of solvent diluents is a widely employed expedient and the dilution thus achieved does permit a more effective degree of control. In halogenation reactions where the halogen is dissolved in a solvent diluent and the solution obtained then employed as the halogenating agent, the dilution of the halogen and the use of the dilute halogen not only involves a considerable degree of danger to the operatives conducting both the dilution step and halogenation but the dilution must be precise if the reaction conditions subsequently employed are to be suitably controlled.

I have now found that halogenation reactions involving the use of a halogenating agent comprising a fluid halogen and a solvent diluent may be effected conveniently if the diluent employed comprises a current of air, or other inert gas, which is passed through or mixed with the fluid halogen at a rate sufficient to carry the desired quantity of halogen therewith and the resulting mixture of air, or other inert gas, and halogen introduced into the reaction medium containing the organic compound to be halogenated. The use of air or other inert gaseous diluent enables the halogen to be diluted to any desired degree merely by passing a current of air through the halogen, as in the case of bromine, or mixing it with the halogen vapors, as in the case of chlorine or fluorine. The use of flow-meters enables the degree of dilution to be closely controlled. When the gas/halogen mixture is introduced into the reaction medium at the desired degree of dilution, the diluent air or other inert gas acts to agitate the reaction mixture and enables a more effective distribution to be achieved, thus avoiding any excessive localized concentrations. While the novel process of my invention may be employed with any of the halogens such as fluorine, chlorine or bromine, it will be more particularly described in connection with bromination reactions employing free bromine as the brominating agent.

Thus, for example, in brominating 1-amino-2-sulfo-anthraquinone with bromine to form 1-amino-2-sulfo-4-bromanthraquinone, the reaction has heretofore been effected by dissolving the 1-amino-2-sulfo-anthraquinone in a hot aqueous medium, cooling the solution to about 0° C. and then brominating the anthraquinone compound by gradually introducing a solution of bromine in aqueous hydrochloric or acetic acid into the aqueous solution. The process heretofore employed is more particularly described in United States Patent No. 2,440,760. The preparation of the acid bromine solution has been attended with considerable danger since, as is well-known, the safe handling of liquid bromine is a matter requiring extreme care and caution.

In accordance with my novel process, however, the bromination of 1-amino-2-sulfo-anthraquinone is effected by dissolving the anthraquinone intermediate in hot water, cooling to about 0° C. and then passing a current of dry air laden with bromine vapors through the aqueous solution. Bromination takes place smoothly and may be controlled effectively merely by adjusting the rate of flow of the air/bromine mixture through the aqueous solution. The bromination reaction is continued until the reaction is substantially completed as determined by the amount of bromine added and also by the fact that the concentration of unreacted bromine in solution increases to a value which indicates that mono-bromination is complete. Further addition of bromine is halted since any further reaction taking place comprises the formation of undesirable, dibrominated product.

The bromination reaction is most advantageously effected where the aqueous medium employed for dissolving the 1-amino-2-sulfo-anthraquinone comprises an aqueous solution of sodium chloride or other inorganic salt, such as potassium chloride or sodium sulfate, of such concentration that the 1-amino-2-sulfo-4-brom-anthraquinone will be precipitated from solution, as formed, by the salting-out action of the salt which is present. By thus removing the brominated product the possibility of dibromination wherein the 2-sulfo group is replaced by bromine is held to a minimum. With the bromination effected at a temperature of 0° C. the concentration of sodium chloride in the reaction medium is advantageously maintained from about 3 to 4.5% by weight of the solution.

The concentration of the 1-amino-2-sulfo-anthraquinone in the aqueous salt solution during bromination is preferably maintained at from about 2.5 to 4% on the weight of the solution, but optimum results are obtained when the concentration of said intermediate is from 3 to 3.5% by weight. The use of greater amounts is undesirable as the salting-out effect of the salt present in the aqueous reaction medium will not allow a greater amount of the intermediate to dissolve and the undissolved portion does not undergo reaction. The bromine concentration in the reaction medium should preferably be maintained at from 0.05 to 0.07% by weight over the course of the bromination. As the bromination is substantially completed and the brominated compound precipitated the bromine concentration rises to about 0.09 to 0.1% by weight. At this point further introduction of bromine is halted as the further addition of bromine forms a dibrominated product.

In order to vaporize the bromine and to form the bromine-air mixture employed for effecting the bromination reaction, a stream of dry air heated to a temperature of about 130 to 180° C., say 150° C., is passed at a controlled rate through liquid bromine contained in a suitable vessel. The sensible heat of the heated air supplies the heat of vaporization necessary to vaporize the liquid bromine. Preferably, the liquid bromine is maintained at a temperature of from 10 to 25° C. in order that the rate of vaporization may be accurately controlled since above a temperature of about 25° C. liquid bromine has a relatively high vapor pressure which makes the control somewhat difficult. Thus, by controlling the temperature and volume of heated air flowing through the liquid bromine and the temperature of the liquid bromine itself, which determines the vapor pressure, the rate at which the bromine is vaporized and introduced into the reaction medium may be closely regulated. Further check on the amount of bromine introduced may be made by supporting the vessel containing the liquid bromine on a scale and determining the changes in weight by difference.

In order further to illustrate my invention, but without being limited thereto, the following example is given:

*Example*

3.3 parts by weight of 1-amino-2-sulfo-anthraquinone are dissolved with stirring in 100 parts by weight of a 3% by weight aqueous sodium chloride solution heated to 85° C. After the anthraquinone compound has been dissolved, the warm solution is then cooled to about 0° C. At this temperature, a slight partial precipitation of the 1-amino-2-sulfo-anthraquinone takes place so that the concentration of the intermediate in solution is about 3% by weight. A stream of bromine vapor in admixture with air is then bubbled through the cooled solution, about 0.25 parts by weight of vaporized bromine per hour being introduced with the air stream. The bromination reaction is continued for 6 to 9 hours, until the theoretical amount of bromine has been added. The total addition is determined by observing the weight of the bromine and the container at the start of the reaction and then at the completion of the reaction. An additional check on the completeness of reaction is also had by determining the concentration of free bromine in the reaction mixture. During the course of the bromination, the concentration of free bromine in the reaction mixture is held to about 0.05 to 0.07% by weight of the reaction mixture. When the concentration reaches 0.1% by weight, further addition of bromine is halted to avoid dibromination of the intermediate. The bromine concentration is determined by titration of a sample of the reaction mixture with standardized aqueous sodium thiosulfate. After the bromine addition has been halted, the reaction mixture is stirred for about an hour and the unreacted bromine remaining then neutralized with sodium thiosulfate.

The reaction mixture is then heated to about 90° C. to dissolve the precipitated 1-amino-2-sulfo-4-brom-anthraquinone, 3% on the weight of the reaction mixture of sodium chloride is added and the solution slowly cooled with gentle agitation. Crude 1-amino-2-sulfo-4-brom-anthraquinone crystallizes out and is filtered off. The filtrate is recycled and employed as the solvent medium for the bromination of further quantity of 1-amino-2-sulfo-anthraquinone. The crystals are purified by redissolving in enough hot water at 85° C. to make a 4% by weight solution, about 0.5% by weight of a filter aid, such as diatomaceous earth, is added and the hot solution filtered to remove any insoluble dibrominated material. The press cake is washed with hot water and the washings combined with the original filtrate. The 1-amino-2-sulfo-4-brom-anthraquinone in the combined filtrates is salted from solution by adding 3% by weight of sodium chloride thereto and cooling. The crystalline intermediate is filtered off. A yield of 80% of purified 1-amino-2-sulfo-4-brom-anthraquinone is obtained.

The vaporized bromine/air mixture employed is prepared by heating dry air to a temperature of about 150° C., e. g. by passing the air over electrically heated coils, and the heated air then bubbled through a vessel containing liquid bromine maintained at a temperature of 10 to 25° C. and supported on a scale. The heated air continuously converts a portion of the bromine from a liquid to a vapor by supplying the necessary heat of vaporization thereto.

By my novel process, the conversion to the dibrominated intermediate is held to a minimum. The elimination of the acid bromination step is not only more economical since no acid is necessary but the lowered acidity of the reaction medium minimizes corrosion in the equipment employed. The hazard of handling the bromine is also eliminated since the air-vapor method merely involves the passage of a current of heated air through the liquid bromine employing suitable piping and no mechanical mixing or physical handling is required.

It is to be understood that the foregoing detailed description is given merely by way of illustration and that many variations may be made therein without departing from the spirit of my invention.

Having described my invention, what I desire to secure by Letters Patent is:

1. Process for the production of 1-amino-2-sulfo-4-brom-anthraquinone, which comprises passing a mixture of bromine vapor and air into a solution containing essentially water, from about 2.5 to 4%, based on the weight of the solution, of 1-amino-2-sulfo-anthraquinone and an inorganic salt, selected from the group consisting of sodium chloride, potassium chloride and sodium sulfate, in an amount sufficient to cause the precipitation of the 1-amino-2-sulfo-4-brom-anthraquinone while substantially avoiding the replacement of the 2-sulfo group in the 1-amino-2-sulfo-anthraquinone by bromine.

2. Process for the production of 1-amino-2-sulfo-4-brom-anthraquinone, which comprises passing a mixture of bromine vapor and air into a solution containing essentially water, from about 2.5 to 4%, based on the weight of the solution, of 1-amino-2-sulfo-anthraquinone and from 3 to 4.5%, based on the weight of the solution, of sodium chloride whereby the 1-amino-2-sulfo-4-brom-anthraquinone as formed is precipitated from the solution with substantially no replacement of the 2-sulfo group in the 1-amino-2-sulfo-anthraquinone by bromine.

3. Process for the production of 1-amino-2-sulfo-4-brom-anthraquinone, which comprises passing a mixture of bromine vapor and air into a solution containing essentially water, from 3 to 3.5%, based on the weight of the solution, of 1-amino-2-sulfo-anthraquinone and from 3 to 4.5%, based on the weight of the solution, of sodium chloride, the reaction being effected at a temperature of 0° C., whereby the 1-amino-2-sulfo-4-brom-anthraquinone as formed is precipitated from the solution with substantially no replacement of the 2-sulfo group in the 1-amino-2-sulfo-anthraquinone by bromine.

CLARENCE E. HIESERMAN.

REFERENCES CITED

The following references are of record in the file of this patent:

UNITED STATES PATENTS

| Number | Name | Date |
|---|---|---|
| 1,914,433 | Kranzlein et al. | June 20, 1933 |
| 2,013,035 | Daudt et al. | Sept. 3, 1935 |
| 2,176,181 | Hunsdiecker et al. | Oct. 17, 1939 |
| 2,413,790 | Seymour et al. | Jan. 7, 1947 |
| 2,440,760 | Seymour et al. | May 4, 1948 |

FOREIGN PATENTS

| Number | Country | Date |
|---|---|---|
| 263,395 | Germany | Aug. 9, 1913 |

OTHER REFERENCES

Houben, "Die Methoden der organischen Chemie," vol. 3 (1930), pages 1148 to 1150.